US011197217B1

(12) United States Patent
Vivanco et al.

(10) Patent No.: US 11,197,217 B1
(45) Date of Patent: Dec. 7, 2021

(54) SYSTEMS AND METHODS FOR SINGLE UPLINK OPERATION (SUO) OVER DUAL CONNECTIVITY NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 16/988,348

(22) Filed: Aug. 7, 2020

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0066* (2013.01); *H04W 36/0069* (2018.08); *H04W 48/18* (2013.01); *H04W 88/06* (2013.01)

(58) Field of Classification Search
CPC ............. H04W 88/06; H04W 36/0088; H04W 36/0066; H04W 76/15; H04W 24/10;
(Continued)

(56) References Cited

U.S. PATENT DOCUMENTS

| 10,716,097 | B2 * | 7/2020 | Ozturk | H04W 88/06 |
| 2019/0200406 | A1 * | 6/2019 | Henttonen | H04L 5/0091 |
| 2021/0022171 | A1 * | 1/2021 | Zacharias | H04W 72/1284 |

FOREIGN PATENT DOCUMENTS

| EP | 3852296 A1 * | 7/2021 |
| WO | WO-2020215930 A1 * | 10/2020 |
| WO | WO-2021004317 A1 * | 1/2021 |

* cited by examiner

*Primary Examiner* — Allahyar Kasraian
(74) *Attorney, Agent, or Firm* — Guntin & Gust, PLC; Robert Gingher

(57) ABSTRACT

Aspects of the subject disclosure may include, for example, obtaining, for a plurality of dual connectivity mobile communication devices that are in communication range of a first access point that uses a first radio access technology and a second access point that uses a second radio access technology, a plurality of network communication parameters, the first radio access technology being a different radio access technology than the second radio access technology; obtaining a list of a plurality of configurations, each configuration identifying one or more time slots in which the first radio access technology is to be used and one or more other time slots in which the second radio access technology is to be used; selecting, from the list, a respective configuration to apply to each of the plurality of dual connectivity mobile communication devices, a first configuration that is selected being selected based at least in part upon one or more first network communication parameters, a second configuration that is selected being selected based at least in part upon one or more second network communication parameters; facilitating first communications, via the first access point and the second access point, with a first dual connectivity mobile communication device according to the first configuration, which is changeable in real-time during the first communications; and facilitating second communications, via the first access point and the second access point, (Continued)

with a second dual connectivity mobile communication device according to the second configuration, which is changeable in real-time during the second communications. Other embodiments are disclosed.

20 Claims, 14 Drawing Sheets

(51) Int. Cl.
*H04W 88/06* (2009.01)
*H04W 48/18* (2009.01)

(58) Field of Classification Search
CPC ......... H04W 36/0069; H04W 72/0446; H04W 92/20; H04W 88/10; H04W 36/14; H04W 48/18; H04W 72/0413; H04W 36/08; H04W 36/22; H04W 92/12; H04W 36/30
See application file for complete search history.

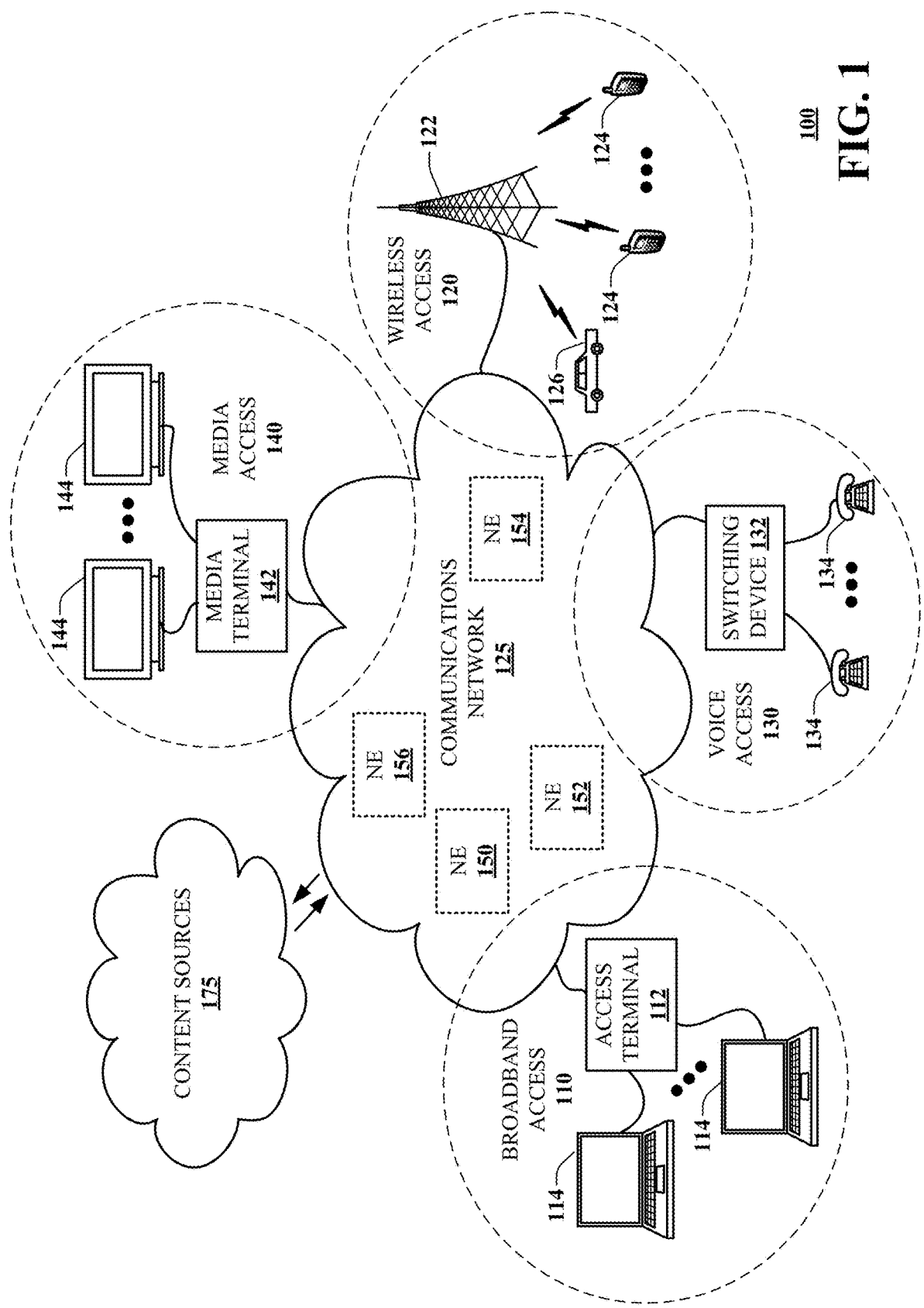

| UL/DL CONFIGURATION | DL/UL SWITCH PERIODICITY | SUBFRAME NUMBER | | | | | | | | | | DL/UL RATIO |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | 2:3 |
| 1 | 5 ms | D | S | U | U | D | D | S | U | U | D | 3:2 |
| 2 | 5 ms | D | S | U | D | D | D | S | U | D | D | 4:1 |
| 3 | 10 ms | D | S | U | U | U | D | D | D | D | D | 7:3 |
| 4 | 10 ms | D | S | U | U | D | D | D | D | D | D | 8:2 |
| 5 | 10 ms | D | S | U | D | D | D | D | D | D | D | 9:1 |
| 6 | 5 ms | D | S | U | U | U | D | S | U | U | D | 2:3:3:2 |

Suitable for Heavy LTE-NR transmission

Suitable for Heavy UL-NR transmission

FIG. 2F

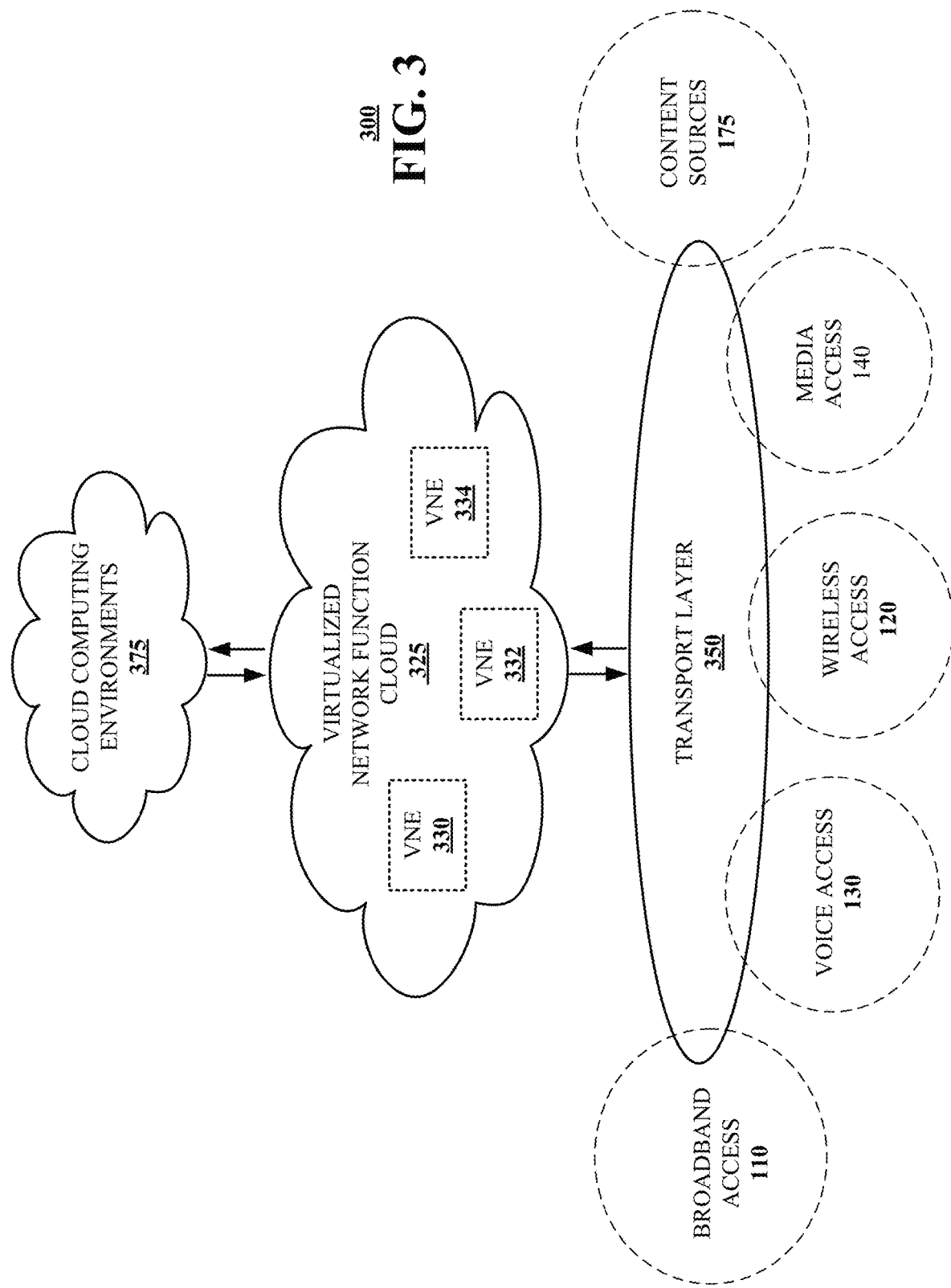

SYSTEMS AND METHODS FOR SINGLE UPLINK OPERATION (SUO) OVER DUAL CONNECTIVITY NETWORKS

FIELD OF THE DISCLOSURE

The subject disclosure relates to systems and methods for Single Uplink Operation (SUO) over dual connectivity networks. In one specific example, the Single Uplink Operation can be over a fourth generation (4G)/fifth generation (5G) dual connectivity network.

BACKGROUND

A conventional mobility management entity (MME) typically exclusively communicates with an LTE eNB (see, e.g., eNB 204 of system 200 in FIG. 2A). In an E-UTRAN New Radio-Dual Connectivity architecture (EN-DC), both the eNB (see, e.g., eNB 204 in FIG. 2A) and the gNB (see, e.g., gNB 206 in FIG. 2A) typically use the LTE Core Network (see, e.g., Enhanced Packet Core (EPC) 208 in FIG. 2A). In this context, the LTE eNB is typically referred to as the MeNB to indicate that it is the "Master" (M) base station controlling the "Secondary" (S) 5G NR (New Radio) base station (also known as the SgNB). Of note, the terms "5G" and "NW" can sometimes be used herein interchangeably. Further, there are times when gNB and eNB might change places for "first" and "second" connection. The S1 and X2 interfaces (see, e.g., FIG. 2A) are conventional mechanisms typically found in an LTE architecture. Both the MeNB and the SgNB typically have an S1-U (User) interface for transferring data to a single user.

Transfer of data is typically split between LTE and 5G, wherein control of dual connectivity is always in the hands of the eNB. When the User Equipment (see, e.g., Dual Connectivity (DC) UE 202 in FIG. 2A) wants to exchange data with the network, the UE establishes a connection with the LTE network. If the eNB has an "integrated" gNB and if the UE indicates support for EN-DC on the frequency band the gNB is operated on, the LTE eNB will instruct the UE to make measurements on the 5G channel. If the UE finds a candidate gNB, the eNB will then communicate to the gNB and give the gNB all necessary parameters to establish a nearly simultaneous connection to the UE as well. Once the gNB confirms the connection setup, the eNB will then forward a part of the incoming user data to the gNB for transmission to the UE. Optionally, the eNB can then ask the core network S-GW (serving gateway) to directly exchange user data with the gNB. In this case, the gNB will then forward a part of the user data to the eNB.

A 5G EN-DC UE typically includes: an LTE unit (RX/TX radio+protocol stack) and additional 5G unit (RX/TX radio+protocol stack). Such UEs are capable of receiving data from LTE and 5G simultaneously, which increases the data rate.

Reference will now be made to certain aspects of conventional UE Power Sharing for LTE-NR Dual Connectivity. In this regard, maximum allowed power values for LTE (P_LTE) and NR (P_NR) are set separately. In general, P_LTE+P_NR=P_powerclass, where "P_powerclass" is the configured maximum UE output power (e.g., P_powerclass=23 dbm). However, some UEs may support different configurations based on their capabilities, such as: P_LTE+P_NR>P_powerclass. For example, Power Class 2 allows for output power levels of 26 dBm, while Power Class 3 allows for power levels of 23 dbm.

Still referring to certain aspects of conventional UE Power Sharing, it is noted that there are two different types of LTE-NR DC UEs with respect to UL power sharing capabilities: Type-1 (UE with dynamic power sharing); and Type-2 (UE without dynamic power sharing).

In Type-1 (UE with dynamic power sharing), the UE supports simultaneous LTE and New radio (NR) transmission, regardless of the sum of the configured P_LTE and P_NR, i.e. even when the sum is higher, equal or less than P_powerclass. UEs of this class can operate without performance compromises both in the cell center and in cell edge or other coverage limited situations.

In Type-2 (UE without dynamic power sharing), the UE supports simultaneous LTE and NR transmission only when the sum of the configured P_LTE and P_NR is equal or less than P_powerclass. If the sum of the configured P_LTE and P_NR is more than P_powerclass, the UE can only operate with time division multiple access (TDM) based single uplink (UL) transmission (i.e., single UL operation). UEs of this class will either have worse UL coverage or lower UL data rates/throughput or both. The network has two basic operation possibilities for these UEs: (a) Limit the UL coverage by setting P_LTE+P_NR<P_powerclass, meaning that the UE cannot reach its maximum UE Tx power (e.g. 23 dBm) for single technology like LTE (e.g., Pcell); (b) Operate UEs without dynamic power sharing in single UL transmission mode to allow using maximum UE Tx power (e.g. 23 dBm) for single technology like LTE.

Still referring to certain aspects of conventional UE Power Sharing, it is likely that the first LTE-NR DC UEs will be Type-2 (i.e., not support UL power sharing). Therefore, in this context, P_powerclass has to be split between LTE and NR technology. However, this may create LTE UL coverage problems (see, e.g., FIG. 2B), since Uplink P_LTE will have to decrease when P_NR increases, since P_LTE+P_NR=P_powerclass (such LTE Uplink coverage reduction may result in a call drop and/or poor service experience at cell edge).

Further, the network may decide to configure TDM UL single transmission in difficult LTE-NR DC combinations, in which transmission power of one technology may create interference on TX or RX of the other technology.

To mitigate the self-interference issue, 3GPP has specified which band combinations are allowed to stray from the stringent requirement for simultaneous operation (certain band combinations create non-linear intermodulation products, wherein a combination of two or more transmit bands create an interfering signal in a receive band of another radio). However, there are exceptions such as Band 3 for LTE (1.8 Ghz)+Band n78 for 5G (3 GHz), which may result in inter-frequency/inter-band interference. In general, in this context, it would be desirable to avoid TDM based single UL transmission as much as possible due to its negative UL throughput and system performance implications. For example, the network has to synchronize the usage of the pattern, and the single uplink operation for some UEs may also reduce scheduling efficiency for other UEs, such as Type-1 UEs.

Reference will now be made to certain aspects of conventional Single Uplink Operation (SUO) over an EN-DC Network. When Single Uplink Operation is configured over an EN-DC Network, LTE-uplink transmissions and NR-uplink transmissions are scheduled over TDM mode. By doing such scheduling over TDM mode, inter-technology interference is typically avoided.

Referring now to FIG. 2C, a TDM schedule showing a number of conventional DL/UL configurations is shown. Subframes labeled with "U" are reserved for Uplink transmission, while Subframes labeled with "D" & "S" are reserved for Downlink transmission. When TDM mode is used for (SUO) over EN-DC Network, "U" subframes are reserved for LTE uplink transmission, and subframes with "D" and "S" are reserved for NR uplink transmission. The eNB broadcasts the supported TDM UL/DL configuration to its attached UEs. This information comes in the Subframe-Assignment field in the rrc.tdd-Config element of the SIB1 message (see, e.g., FIG. 2D, showing an example SIB1 message with TDD_Config_Element.

Still referring to certain aspects of conventional Single Uplink Operation (SUO) over an EN-DC Network, UL BitRate per Technology is impacted based on TDM Configuration. For example, in TDM Config-5 (see, e.g., the sixth row down from the top in FIG. 2C) data will be scheduled to NR-UL Channel (subframe "D" and "S") 90% of the time, and data will be scheduled to LTE-UL channel (subframe "U") 10% of the time.

Further, when switching from Downlink to Uplink, there is typically need for a Special subframe and typically no Special subframe is needed when switching from Uplink to Downlink. In TDM, there are two periodicity frames: one with 5 ms periodicity and another with 10 ms periodicity. A special subframe is introduced at subframe #1 and subframe #6 and each half frame of 5 ms carries one special subframe in case of 5 ms periodicity subframe. Of note, a 10 ms periodicity frame has only one Special subframe as subframe #1. Of further note, if 2 S-Frames are presented in 10 ms frame, then this TDM configuration has 5 ms DL to UL periodicity. Similarly, if only 1 S-Frame is presented in 10 ms frame, this TDM configuration has 10 ms DL to UL periodicity.

As noted, it is possible that LTE-NR DC Network operators would need to configure TDM UL single transmission in some circumstances to avoid inter-Freq/inter-Technology interference. Under these circumstances, the operator may typically use a static TDM DL/UL configuration. This will result in both LTE-uplink and NR uplink transmissions always be throughput capped regardless of the IRAT (Inter Radio Access Technology) demand. In addition, this may result in situations in which resources are used inefficiently.

BRIEF DESCRIPTION OF THE DRAWINGS

Reference will now be made to the accompanying drawings, which are not necessarily drawn to scale, and wherein:

FIG. 1 is a block diagram illustrating an example, non-limiting embodiment of a communication network in accordance with various aspects described herein.

FIG. 2F is a diagram illustrating various example, non-limiting embodiments in which certain TDM scheduling configurations are shown as applied to various networking scenarios.

FIG. 3 is a block diagram illustrating an example, non-limiting embodiment of a virtualized communication network in accordance with various aspects described herein.

DETAILED DESCRIPTION

Figure 2A:
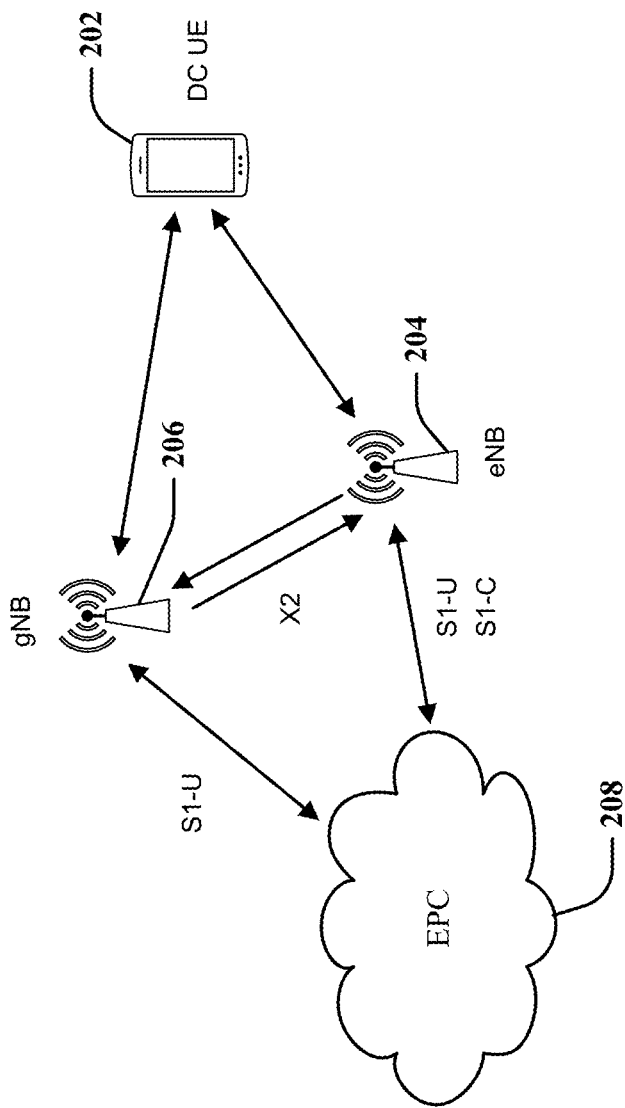
FIG. 2A is a block diagram illustrating an example communication network utilized to show certain conventional networking aspects (as seen, this system 200 includes dual connectivity user equipment (DC UE) 202, eNB 204, gNB 206, and EPC (Enhanced Packet Core) 208).
Figure 2B:
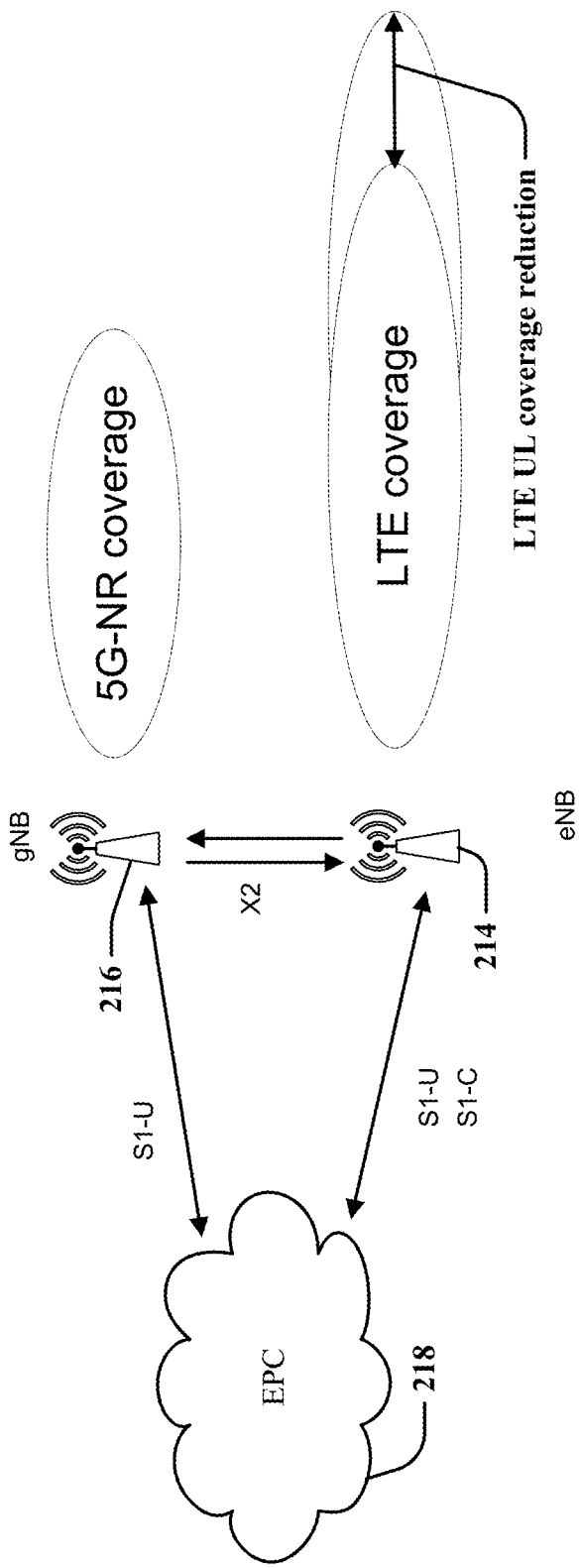
FIG. 2B is a block diagram illustrating an example communication network utilized to show certain conventional networking aspects (as seen, this system 210 includes, eNB 214, gNB 216, and EPC (Enhanced Packet Core) 218).
Figure 2C:
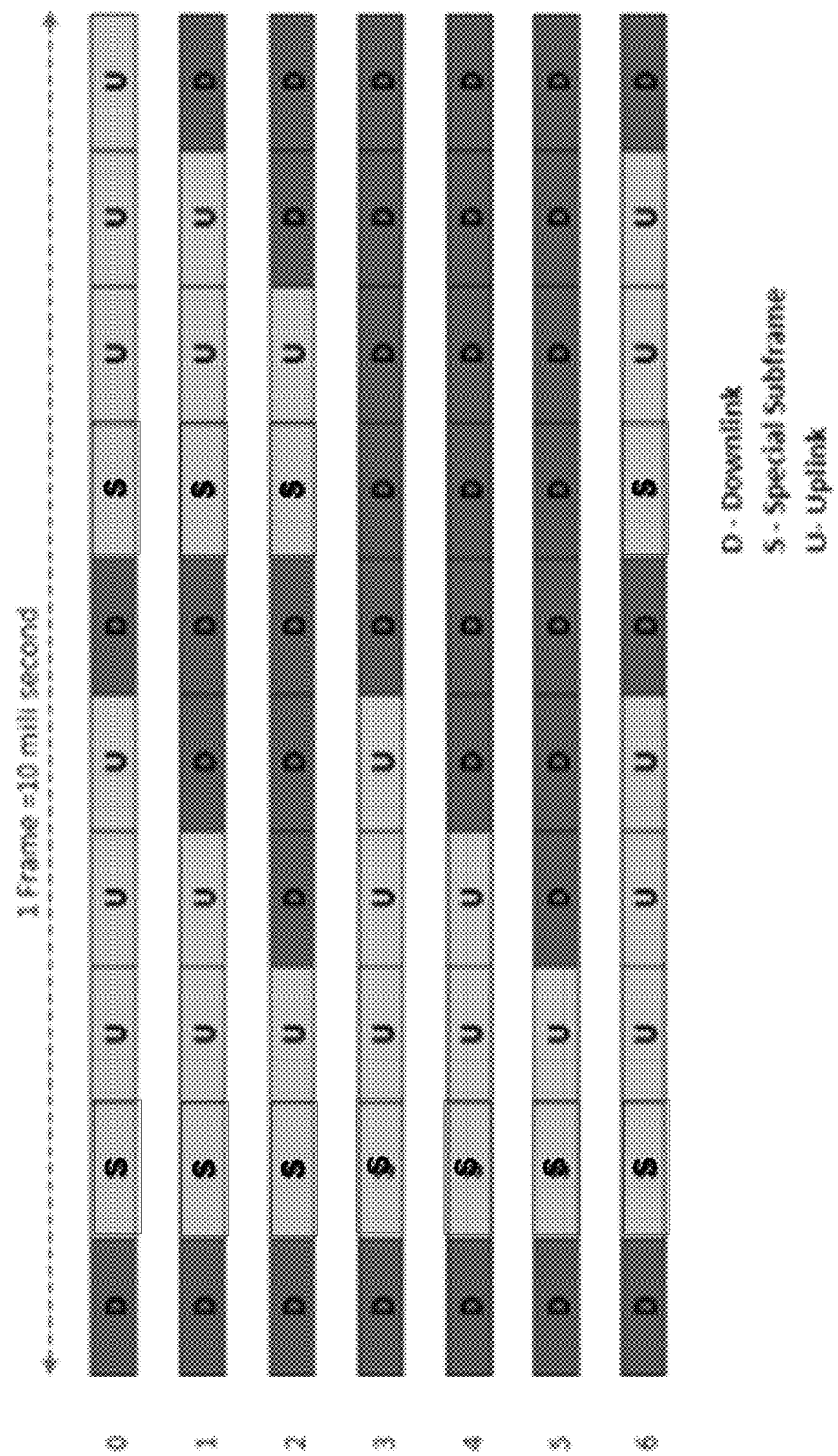
FIG. 2C is a diagram illustrating an example list of certain conventional TDM scheduling configurations.
Figure 2D:
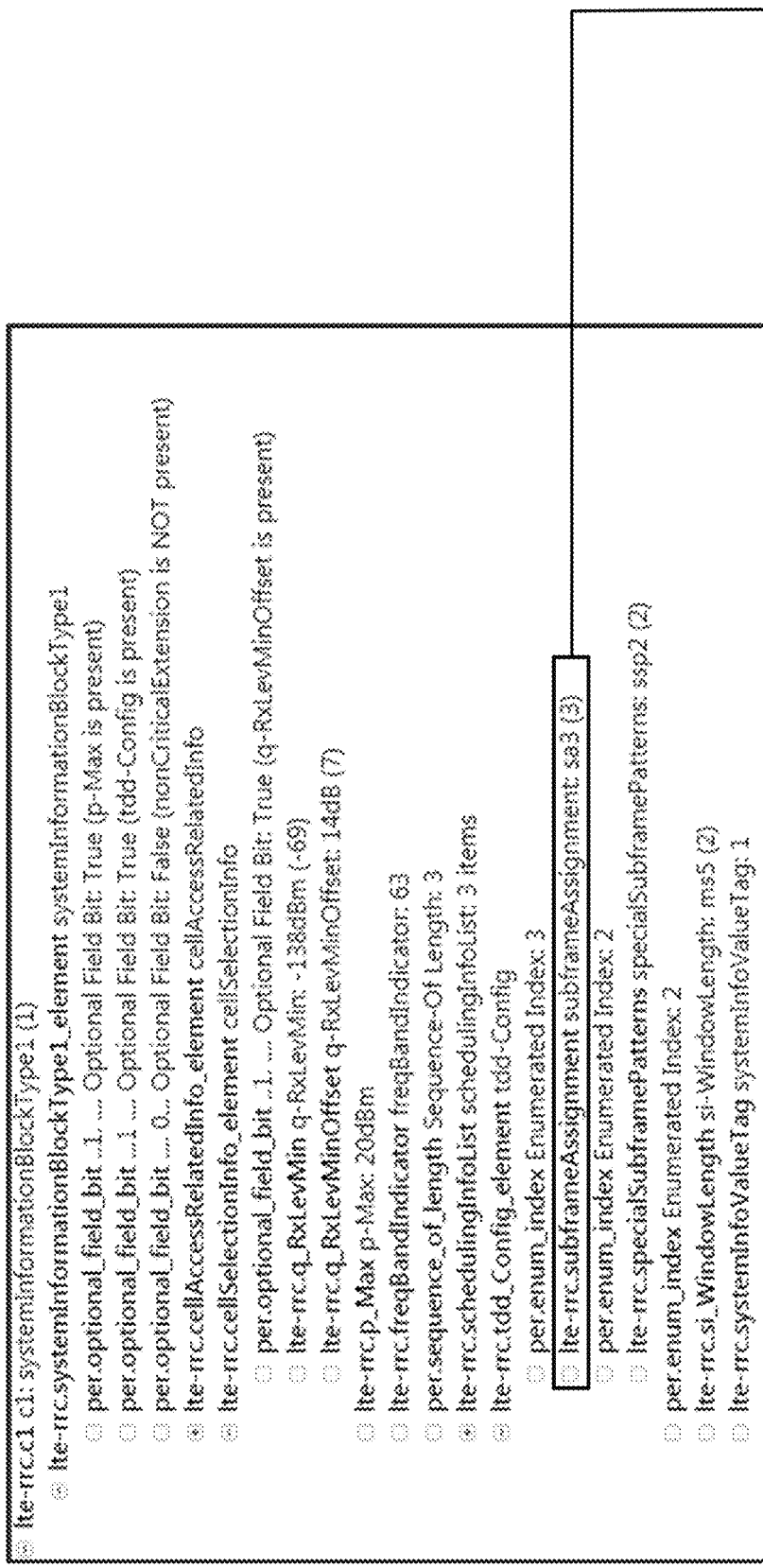
FIG. 2D is a diagram illustrating an example conventional SIB1 message with TDD_Config_Element and an example list of certain conventional TDM scheduling configurations (with configuration no. 3 being selected in this example).

The subject disclosure describes, among other things, illustrative embodiments for Single Uplink Operation over dual connectivity networks. Other embodiments are described in the subject disclosure.

In one specific example, the Single Uplink Operation can be over a fourth generation (4G)/fifth generation (5G) dual connectivity network.

Other embodiments can apply to 4G, 5G and/or one or more other generations of wireless communication systems. For example, various embodiments can apply to one or more generations of wireless communication systems subsequent to 5G (e.g., 6G, 7G and/or any subsequent generation(s)). In another example, various embodiments can apply to WiFi.

In one specific example, various embodiments can be applied in the context of E-UTRAN New Radio-DC (5G NSA-Option 3x).

One or more aspects of the subject disclosure include a methodology to adjust TDM DL/UL configuration when Single Uplink Operation (SUO) is configured over EN-DC Network. In various embodiments, the methodology is applied in a network which serves a geographic area (e.g., a city) where an EN-DC Network is deployed, and Uplink transmission of one technology (e.g., LTE) may create interference (in the absence of use of one or more embodiments) into one or more channels of another technology (e.g., 5G).

One or more aspects of the subject disclosure include an algorithm that can be placed at a central node global control located on the Core Network (e.g., Mobile Edge Compute (MEC), Self Organized Network (SON) or RAN Intelligent Controller (RIC)). In various embodiments the algorithm has knowledge of LTE/5G network topology.

One or more aspects of the subject disclosure include an algorithm that can perform the following actions: (a) Measure aggregated TX power of each technology (e.g., LTE and 5G) and the interference that these emissions create into the other technology (e.g., UL or DL Channel). For example, aggregated TX power per technology can be estimated by adding individual UE TX power of all UEs connected to a given Base Station. The Base Station can use Power Headroom Report (PHR) sent by the UE to estimate how much transmission power is left for a UE to use, e.g., PHR=UE Max Transmission Power-PUSCH (Physical Uplink Shared Channel) Power. PHR are sent periodically based on a timer. In another example, the algorithm can query each technology/channel interference KPIs (Key Performance Indicators), e.g., SNR (signal to noise ratio) and/or RSRQ (reference signal received quality); (b) Collect information of the traffic profile on each technology. The collected information can include demand and QoS (Quality of Service). Further, the algorithm can collect corresponding traffic profile, and user behavior from other network elements (e.g., DPI (Deep Packet Inspection)) for all UEs connected to these Base Station(s); and/or (c) Collect UE capabilities information of all UEs connected to these Base Station(s). These UEs may be, for example, (Type-1), (Type-2), or LTE-Only UEs.

In one embodiment, based on the information collected, the algorithm will decide whether or not to mandate both LTE and 5G Base Stations in a given area to engage into SUO and/or the algorithm will select the most suitable TDD DL/UL configuration.

Referring now to FIG. 1, a block diagram is shown illustrating an example, non-limiting embodiment of a system 100 in accordance with various aspects described herein. For example, system 100 can facilitate in whole or in part selection for a particular dual connectivity mobile communication device of a suitable time division multiple access communication configuration (e.g., a time division multiple access communication configuration that minimizes inter-band interference and/or that optimizes use of network resources). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2E:
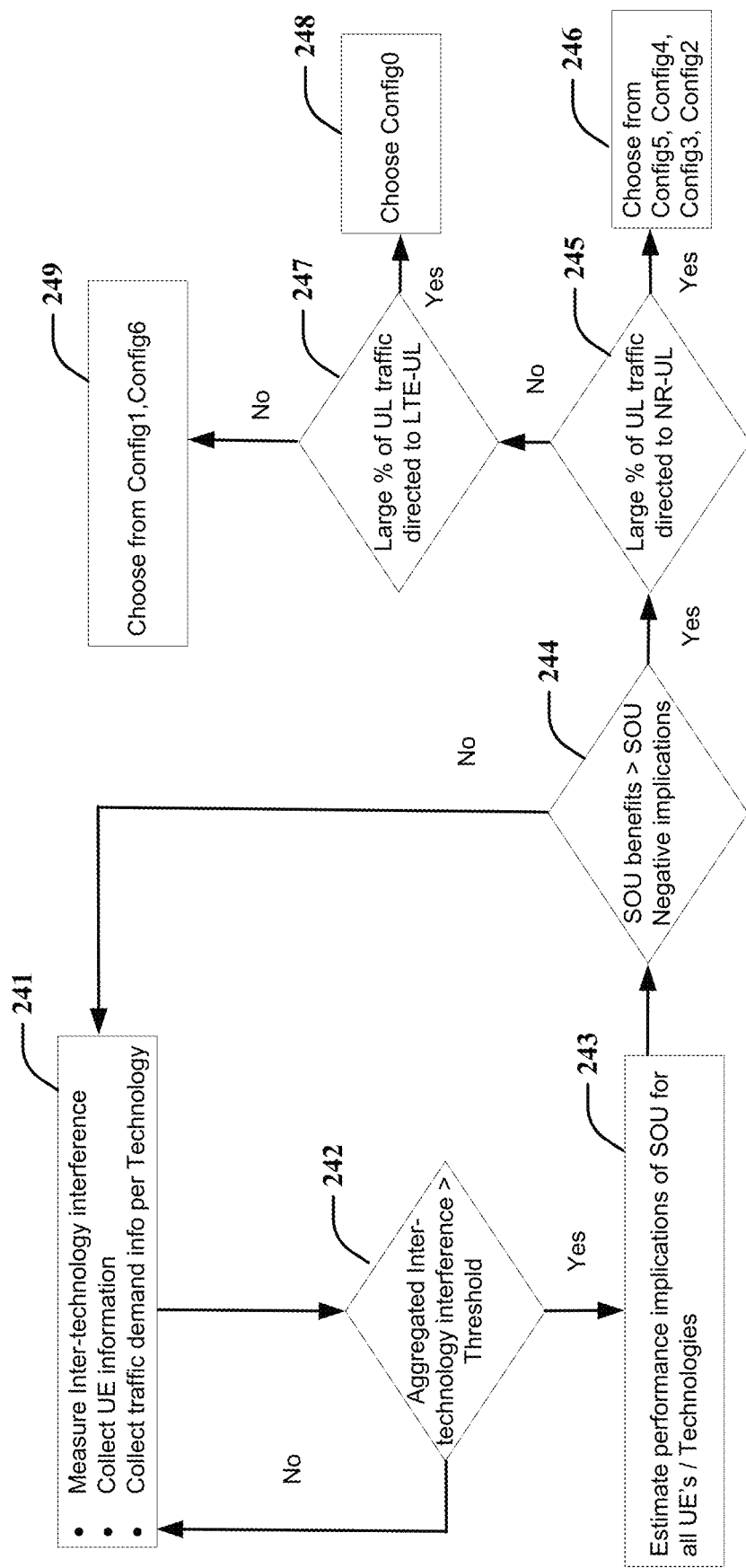
FIG. 2E is a block diagram illustrating an example, non-limiting embodiment of a process flow (which can function within the communication network of FIG. 1) in accordance with various aspects described herein.

Referring now to FIG. 2E, this is a block diagram illustrating an example, non-limiting embodiment of a process flow 240 (which can function within the communication network of FIG. 1) in accordance with various aspects described herein. The process flow 240 can start at step 241, which comprises: measure inter-technology interference, collect UE information, and collect traffic demand information per technology (e.g. LTE and 5G). The process flow can then continue to decision block 242, where a determination is made as to whether aggregated inter-technology interference is greater than a threshold (in other examples, the decision can be greater than or equal, less than, less than or equal, meeting a threshold, or not meeting a threshold). If the decision at block 242 is "No", then the process returns to step 241 for iteration. If the decision at block 242 is "Yes", then the process moves to step 243, which comprises estimate performance implications of SUO for all UE's and technologies (e.g., LTE and 5G). From step 243, the process flow continues to decision block 244, where a determination is made as to whether SUO benefits are greater than SUO negative implications (in other examples, the decision can be greater than or equal, less than, less than or equal, meeting a threshold, or not meeting a threshold). If the decision at block 244 is "No", then the process returns to step 241 for iteration. If the decision at block 244 is "Yes", then the process moves to decision block 245, where a determination is made as to whether a large percentage of UL traffic is directed to NR-UL (in one example, the percentage can be in the range of 60%-100% (inclusive); in another example, the "large" percentage can be as compared to demand for other UEs in the cell, as compared to demand from the served UE, and/or with respect to UL resources constrained by DL TDD demands within the cell). If the decision at block 245 is "Yes", then the process moves to step 246, where one of Config5, Config4, Config3 or Config2 (see, e.g., FIG. 2F) is chosen for use. If the decision at block 245 is "No", then the process moves to decision block 247, where a determination is made as to whether a large percentage of UL traffic is directed to LTE-UL (in one example, the percentage can be in the range of 60%-100% (inclusive); in another example, the "large" percentage can be as compared to demand for other UEs in the cell, as compared to demand from the served UE, and/or with respect to UL resources constrained by DL TDD demands within the cell). If the decision at block 247 is "Yes", then the process moves to step 248, where Config0 (see, e.g., FIG. 2F) is chosen for use. If the decision at block 247 is "No", then the process moves to step 249, where one of Config1 or Config6 (see, e.g., FIG. 2F) is chosen for use.

Figure 2G:
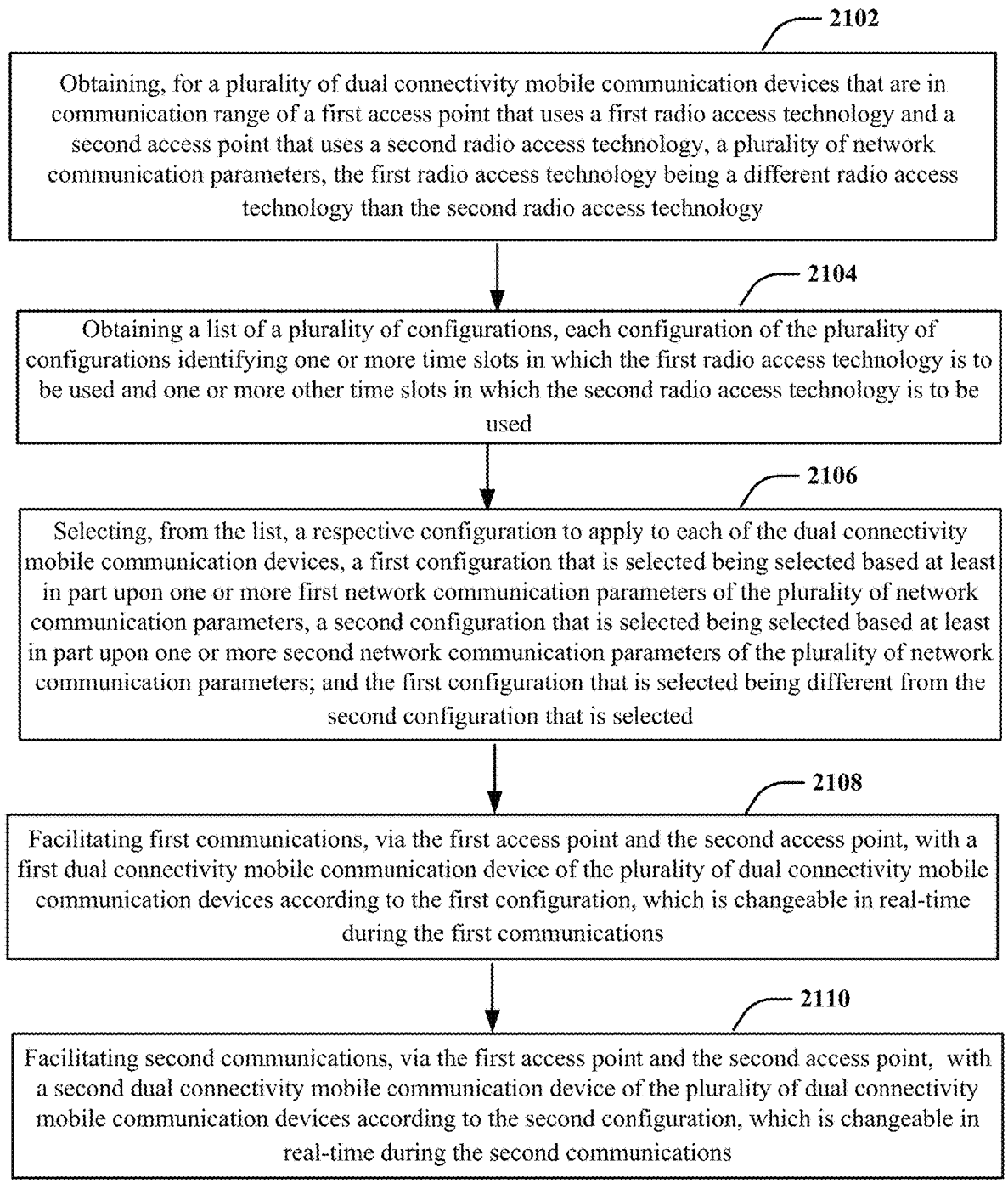
FIG. 2G depicts an illustrative embodiment of a method in accordance with various aspects described herein.

Referring now to FIG. 2G, various steps of a method 2100 according to an embodiment are shown. As seen in this FIG. 2G, step 2102 comprises obtaining, for a plurality of dual connectivity mobile communication devices that are in communication range of a first access point that uses a first radio access technology and a second access point that uses a second radio access technology, a plurality of network communication parameters, the first radio access technology being a different radio access technology than the second radio access technology. Next, step 2104 comprises obtaining a list of a plurality of configurations, each configuration of the plurality of configurations identifying one or more time slots in which the first radio access technology is to be used and one or more other time slots in which the second radio access technology is to be used. Next, step 2106 comprises selecting, from the list, a respective configuration to apply to each of the plurality of dual connectivity mobile communication devices, a first configuration that is selected being selected based at least in part upon one or more first network communication parameters of the plurality of network communication parameters, a second configuration that is selected being selected based at least in part upon one or more second network communication parameters of the plurality of network communication parameters; and the first configuration that is selected being different from the second configuration that is selected. Next, step 2108 comprises facilitating first communications, via the first access point and the second access point, with a first dual connectivity mobile communication device of the plurality of dual connectivity mobile communication devices according to the first configuration, which is changeable in real-time during the first communications. Next, step 2110 comprises facilitating second communications, via the first access point and the second access point, with a second dual connectivity mobile communication device of the plurality of dual connectivity mobile communication devices according to the second configuration, which is changeable in real-time during the second communications. In one specific example, the first configuration can be changed one time or a plurality of times during the first communications. In another specific example, the second configuration can be changed one time or a plurality of times during the second communications.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2H:
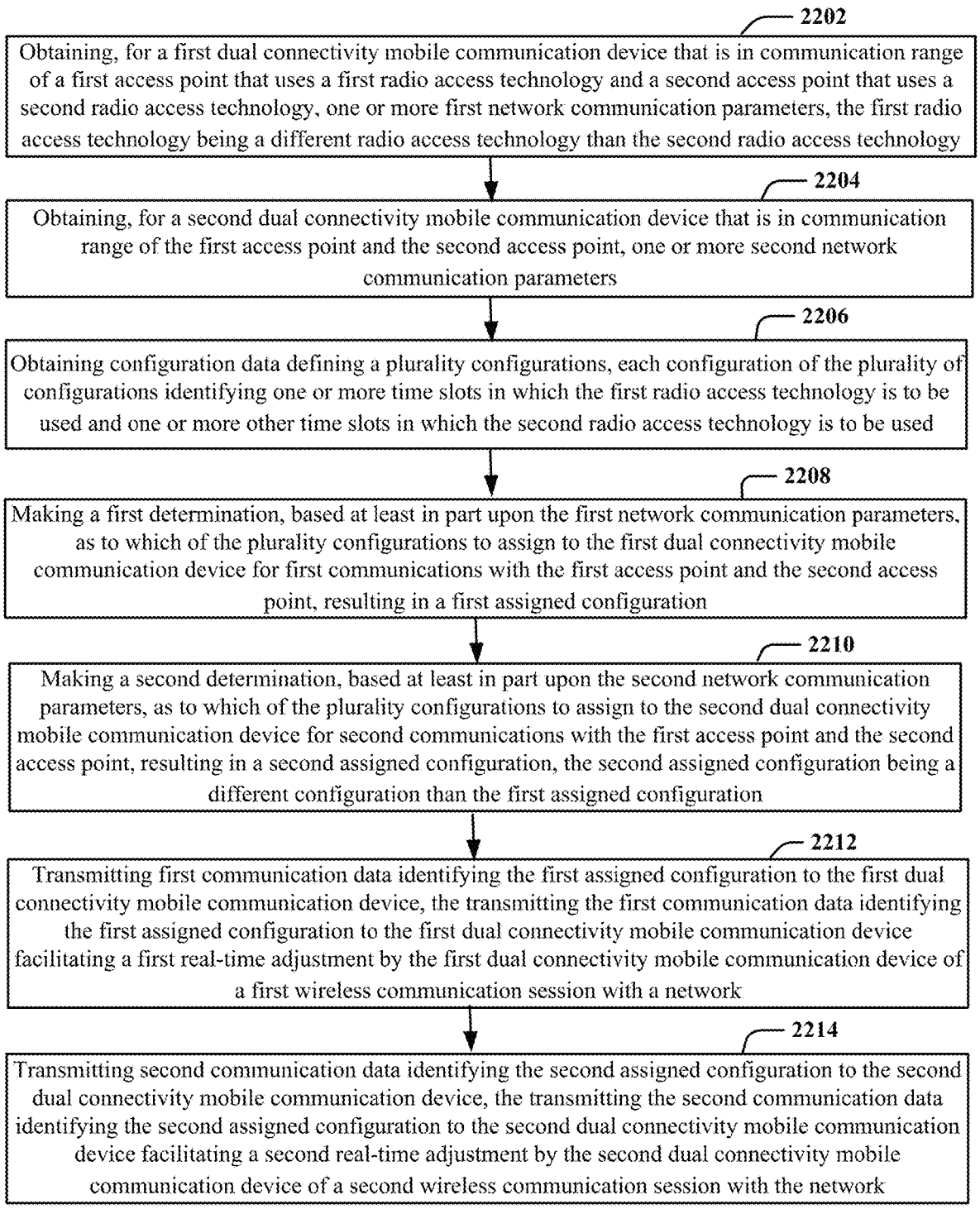
FIG. 2H depicts an illustrative embodiment of a method in accordance with various aspects described herein.

Referring now to FIG. 2H, various steps of a method 2200 according to an embodiment are shown. As seen in this FIG. 2H, step 2202 comprises obtaining, for a first dual connectivity mobile communication device that is in communication range of a first access point that uses a first radio access technology and a second access point that uses a second radio access technology, one or more first network communication parameters, the first radio access technology being a different radio access technology than the second radio access technology. Next, step 2204 comprises obtaining, for a second dual connectivity mobile communication device that is in communication range of the first access point and the second access point, one or more second network communication parameters. Next, step 2206 comprises obtaining configuration data defining a plurality of configurations, each configuration of the plurality of configurations identifying one or more time slots in which the first radio access technology is to be used and one or more other time slots in which the second radio access technology is to be used. Next, step 2208 comprises making a first determination, based at least in part upon the one or more first network communication parameters, as to which of the plurality of configurations to assign to the first dual connectivity mobile communication device for first communications with the first access point and the second access point, resulting in a first assigned configuration. Next, step 2210 comprises making a second determination, based at least in part upon the one or more second network communication parameters, as to which of the plurality configurations to assign to the second dual connectivity mobile communication device for second communications with the first access point and the second access point, resulting in a second assigned configuration, the second assigned configuration being a different configuration than the first assigned configuration. Next, step 2212 comprises transmitting first communication data identifying the first assigned configuration to the first dual connectivity mobile communication device, the transmitting the first communication data identifying the first assigned configuration to the first dual connectivity mobile communication device facilitating a first real-time adjustment by the first dual connectivity mobile communication device of a first wireless communication session with a network. Next, step 2214 comprises transmitting second communication data identifying the second assigned configuration to the second dual connectivity mobile communication device, the transmitting the second communication data identifying the second assigned configuration to the second dual connectivity mobile communication device facilitating a second real-time adjustment by the second dual connectivity mobile communication device of a second wireless communication session with the network. In one specific example, the first communication data can be transmitted to the first dual connectivity mobile communication device during the first wireless communication session with the network. In another specific example, the second communication data can be transmitted to the second dual connectivity mobile communication device during the second wireless communication session with the network.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2I:
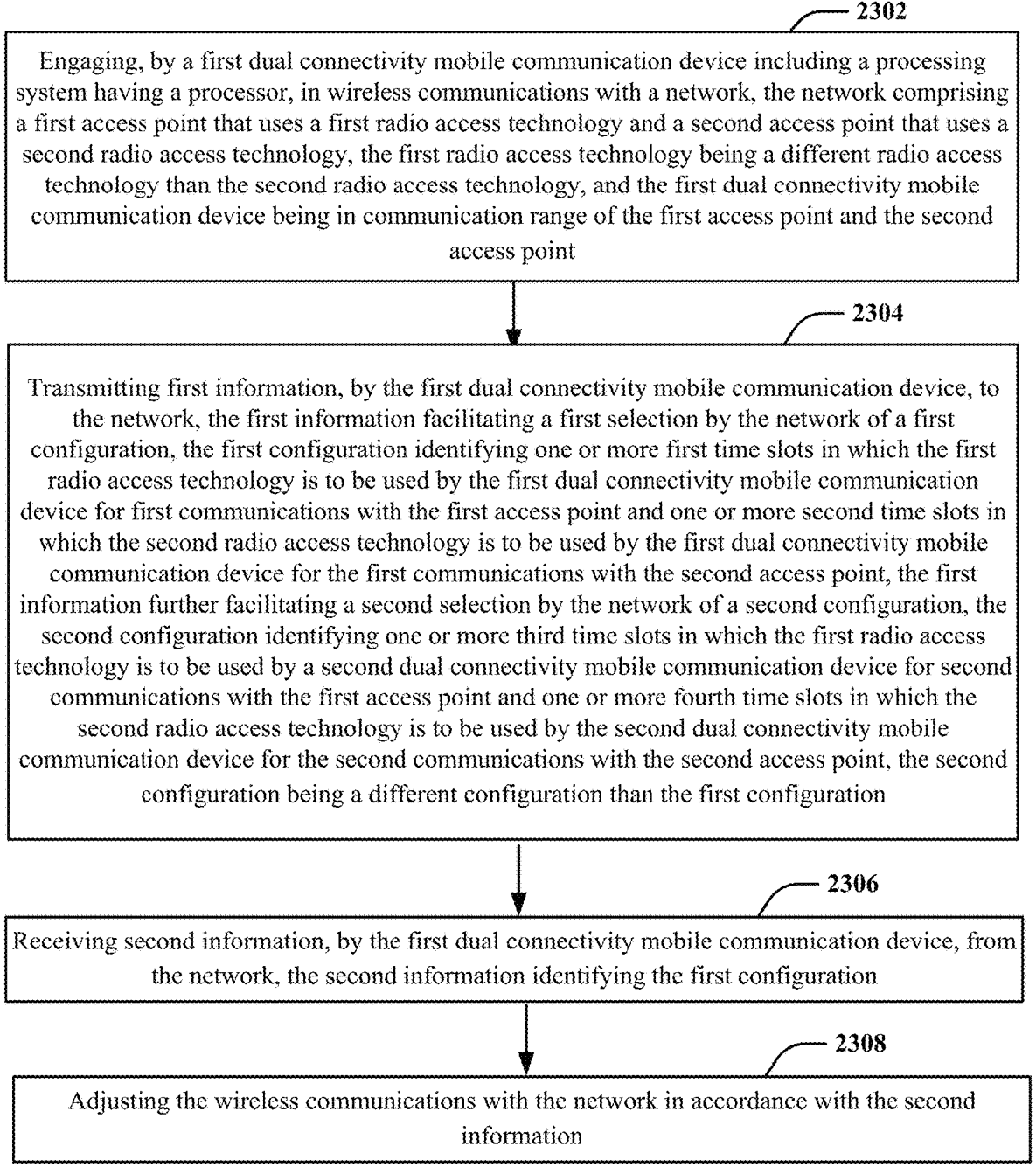
FIG. 2I depicts an illustrative embodiment of a method in accordance with various aspects described herein.

Referring now to FIG. 2I, various steps of a method 2300 according to an embodiment are shown. As seen in this FIG. 2I, step 2302 comprises engaging, by a first dual connectivity mobile communication device including a processing system having a processor, in wireless communications with a network, the network comprising a first access point that uses a first radio access technology and a second access point that uses a second radio access technology, the first radio access technology being a different radio access technology than the second radio access technology, and the first dual connectivity mobile communication device being in communication range of the first access point and the second access point. Next, step 2304 comprises transmitting first information, by the first dual connectivity mobile communication device, to the network, the first information facilitating a first selection by the network of a first configuration, the first configuration identifying one or more first time slots in which the first radio access technology is to be used by the first dual connectivity mobile communication device for first communications with the first access point and the second access point and one or more second time slots in which the second radio access technology is to be used by the first dual connectivity mobile communication device for the first communications with the first access point and the second access point, the first information further facilitating a second selection by the network of a second configuration, the second configuration identifying one or more third time slots in which the first radio access technology is to be used by a second dual connectivity mobile communication device for second communications with the first access point and the second access point and one or more fourth time slots in which the second radio access technology is to be used by the second dual connectivity mobile communication device for the second communications with the first access point and the second access point, the second configuration being a different configuration than the first configuration. Next, step 2306 comprises receiving second information, by the first dual connectivity mobile communication device, from the network, the second information identifying the first configuration. Next, step 2308 comprises adjusting, by the first dual connectivity mobile communication device, the wireless communications with the network in accordance with the second information.

While for purposes of simplicity of explanation, the respective processes are shown and described as a series of blocks in FIG. 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can operate in the context of time division multiple access (TDM). In one specific example, the TDM can be time division duplexing (TDD).

Reference will now be made to certain example scenario implementations according to various embodiments. Example #1: In a given geographic area (e.g., a city) a conventional LTE Uplink transmission may create interference into NR-Uplink channel, and vice-versa. In this scenario, the network operator decides to use TDD Config-0. SIB1 messages include this TDD configuration and it is broadcast to UEs attached to eNB in this area. This configuration will schedule data to NR-UL channel 40% of the time, and schedule data to LTE-UL channel 60% of the time. A large number of UEs are engaged into heavy Upload, and a large amount of this uplink traffic is directed to NR-UL channel. A consequence of a conventional approach in this scenario is that TDD Config-0 favors more LTE-UL channel which does not align with the Dual-Connectivity Uplink demand. In contrast, under various embodiments (e.g., real-time changing of the chosen configuration), better alignment with Dual-Connectivity Uplink demand can be obtained.

Still referring to certain example scenario implementations according to various embodiments, discussion will be directed to Example #2: In a given geographic area (e.g., city) conventional LTE Uplink transmission may create interference into NR-Uplink channel, and vice-versa. In this scenario, the network operator decides to use TDD Config-5. SIB1 messages include this TDD configuration and it is broadcast to UEs attached to eNB in this area. This configuration will schedule data to NR-UL channel 90% of the time, and schedule data to LTE-UL channel 10% of the time. High-Priority voice and video service (e.g., VoLTE & ViLTE) are scheduled over anchor MeNB and therefore are directed to LTE technology. Large number of UEs are engaged into heavy VoLTE & ViLTE services, and large amount of this uplink traffic is directed to LTE-UL channel. A consequence of a conventional approach in this scenario is that TDD Config-5 favors more NR-UL channel which does not align with the Dual-Connectivity Uplink demand. In contrast, under various embodiments (e.g., real-time changing of the chosen configuration), better alignment with Dual-Connectivity Uplink demand can be obtained.

Still referring to certain example scenario implementations according to various embodiments, discussion will be directed to Example #3: In a given geographic area (e.g., city) conventional LTE Uplink transmission may create interference into NR-Uplink channel, and vice-versa. In this scenario, the network operator decides to use TDD Config-1. SIB1 messages include this TDD configuration and it is broadcast to UEs attached to eNB in this area. This configuration will schedule data to NR-UL channel 60% of the time, and schedule data to LTE-UL channel 40% of the time. There are few UEs connected to the network, therefore there is small/negligible inter-Technology interference. A consequence of a conventional approach in this scenario is that both NR-UL and LTE-UL throughput are capped to 60% and 40% of their nominal throughput, respectively, to prevent inter-Technology interference. Single Uplink Operation is not needed under these circumstances, and UL throughput is impacted on both technologies for no reason. In contrast, under various embodiments (e.g., real-time changing of the chosen configuration), better Inter-Technology RF resources allocation can be achieved resulting in higher throughput.

Still referring to certain example scenario implementations according to various embodiments, discussion will be directed to Example #4: In a given geographic area (e.g., city) conventional LTE Uplink transmission may create interference into NR-Uplink channel, and vice-versa. In this scenario, the network operator decides to use a given DL/UL TDD Config. SIB1 messages include this TDD configuration and it is broadcast to UEs attached to eNB in this area. During the day, UE demand changes per technology as shown in example #1, #2, and #3. A consequence of a conventional approach in this scenario is that DL/UL TDD config does not always align with the Dual-Connectivity Uplink demand during the day. In contrast, under various embodiments (e.g., real-time changing of the chosen configuration), better alignment with Dual-Connectivity Uplink demand can be obtained.

As described herein, various embodiments can provide systems and methods for Single Uplink Operation (SUO) over 4G/5G Dual Connectivity Networks. In various embodiments, systems and methods can be provided for use in the context of one or more subsequent generations of radio technologies.

As described herein, various embodiments can provide a methodology for adjusting a TDM LTE/5G configuration when Single Uplink Operation (SUO) is configured over an EN-DC Network based on IRAT demand and QoS (Quality of Service).

As described herein, various embodiments can provide a methodology that will dynamically adjust TDM LTE/5G configuration when Single Uplink Operation (SUO) is configured over EN-DC Network. The TDM LTE/5G configuration can be done based on IRAT demand and/or QoS. As a result, in various embodiments, inter-Freq/inter-Technology interference will be avoided and at the same time IRAT Dual-Connectivity Uplink demand will be satisfied by assigning suitable TDM configuration.

As described herein, various embodiments can be applied in the context of a Dual Connectivity LTE/5G Network.

As described herein, various embodiments can be applied in the context of a given mobile device (e.g., smartphone) that uses Dual Connectivity LTE/5G. In one specific example, various embodiments can be used to eliminate (or reduce) interference when one or more 5G bands below 6 GHz might interfere with one or more high LTE bands (near 6 Ghz).

As described herein, various embodiments can provide for dynamically assigning (e.g., in real-time) a configuration (such as a time division configuration in which LTE is assigned to one or more time slots and 5G is assigned to one or more other time slots) to align with changing circumstances (e.g., changing network conditions and/or changing end user device locations).

As described herein, various embodiments can provide for an eNB and/or a gNB to dynamically send (e.g., in real-tine) one or more messages to user equipment (e.g., an end user device such as a smartphone) as to which configuration (such as a time division configuration in which LTE is assigned to one or more time slots and 5G is assigned to one or more other time slots) to use at a current time. The messages can be based, for example, upon changing network conditions and/or changing end user device locations.

As described herein, various embodiments can provide a mechanism that facilitates use of LTE and 5G at the same time by one phone.

As described herein, various embodiments can provide a mechanism that reduces (or eliminates) interference when 5G bands below 6 GHz might interfere with high LTE bands (near 6 GHz).

As described herein, various embodiments can provide a mechanism that facilitates use of multiple configurations in order to align with changing circumstances.

As described herein, various embodiments can provide a mechanism that facilitates the sending of one or more messages from an eNB (and/or from a gNB) to a UE (wherein the message(s) indicate which configuration to use at a given time (e.g., which configuration is most suitable for current LTE and/or 5G use). In various examples, the decision as to which configuration to use at a given time can be based upon UE proximity to a base station and/or to one or more other UEs.

As described herein, various embodiments can provide a mechanism that facilitates matching demand (e.g., LTE vs 5G).

As described herein, various embodiments can provide a mechanism that collects (e.g., from the network) the traffic demand (e.g., a phone is currently uploading a big file). The traffic demand can be collected from one or more UEs, one or more eNB s and/or one or more gNBs.

As described herein, various embodiments can provide a mechanism that facilitates selecting an appropriate configuration (e.g., from a set number of possible configurations currently defined by 3GPP). In other examples, an appropriate configuration can be selected from x number of configurations).

As described herein, various embodiments can provide a mechanism that facilitates selecting an appropriate configuration in the form of a ratio of one technology vs. another technology.

As described herein, various embodiments can provide a mechanism that facilitates scheduling multiple UEs on the same resource (wherein, for example, inter-technology interference is reduced (or eliminated)).

As described herein, various embodiments can provide a mechanism that facilitates providing one configuration for a first UE that communicates with a given network element (e.g., an eNB (or gNB)) and another (different configuration) to a second UE that communicates with the given network element (this is in contrast, for example, to certain conventional mechanisms in which an eNB (or gNB) gives a single configuration to all UEs that it is communicating with).

As described herein, various embodiments can provide a mechanism that facilitates independence (as to real-time control of UE configurations) between neighbor eNBs (and/or gNBs).

As described herein, various embodiments can provide obtaining a list of a plurality of configurations, wherein the obtaining the list of the plurality of configurations comprises obtaining the list from one or more databases.

As described herein, various embodiments can provide for a plurality of network communication parameters, wherein the plurality of network communication parameters comprises a first set of network communication parameters and a second set of network communication parameters, wherein the first set of network communication parameters are associated with a first the dual connectivity mobile communication device, and wherein the second set of network communication parameters are associated with a second the dual connectivity mobile communication device. In one specific example, the first set of network communication parameters can be a same set of network communication parameters as the second set of network communication parameters.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 240, and some or all of methods 2100, 2200 and/or 2300. For example, virtualized communication network 300 can facilitate in whole or in part selection for a particular dual connectivity mobile communication device of a suitable time division multiple access communication configuration (e.g., a time division multiple access communication configuration that minimizes inter-band interference and/or that optimizes use of network resources).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
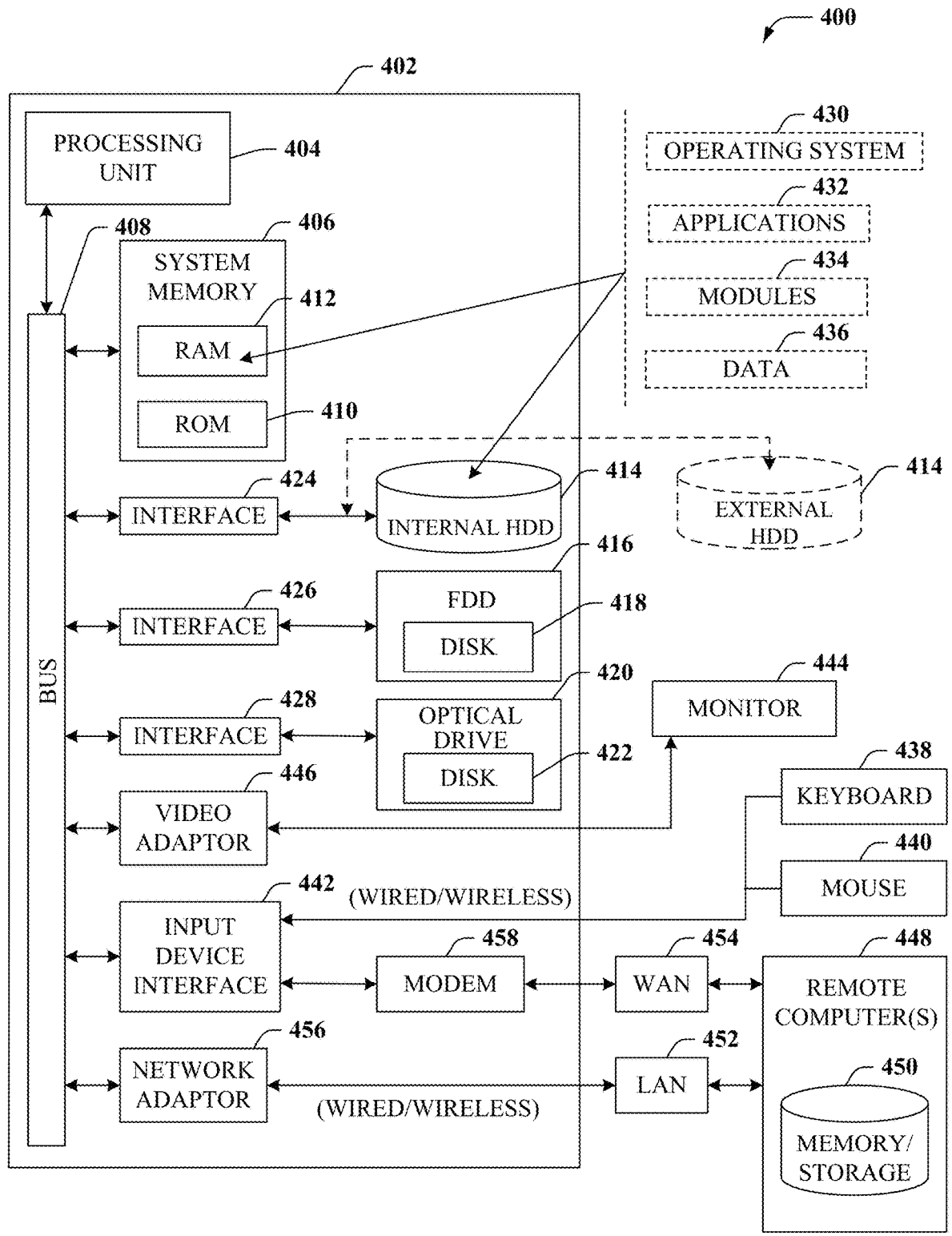
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selection for a particular dual connectivity mobile communication device of a suitable time division multiple access communication configuration (e.g., a time division multiple access communication configuration that minimizes inter-band interference and/or that optimizes use of network resources).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
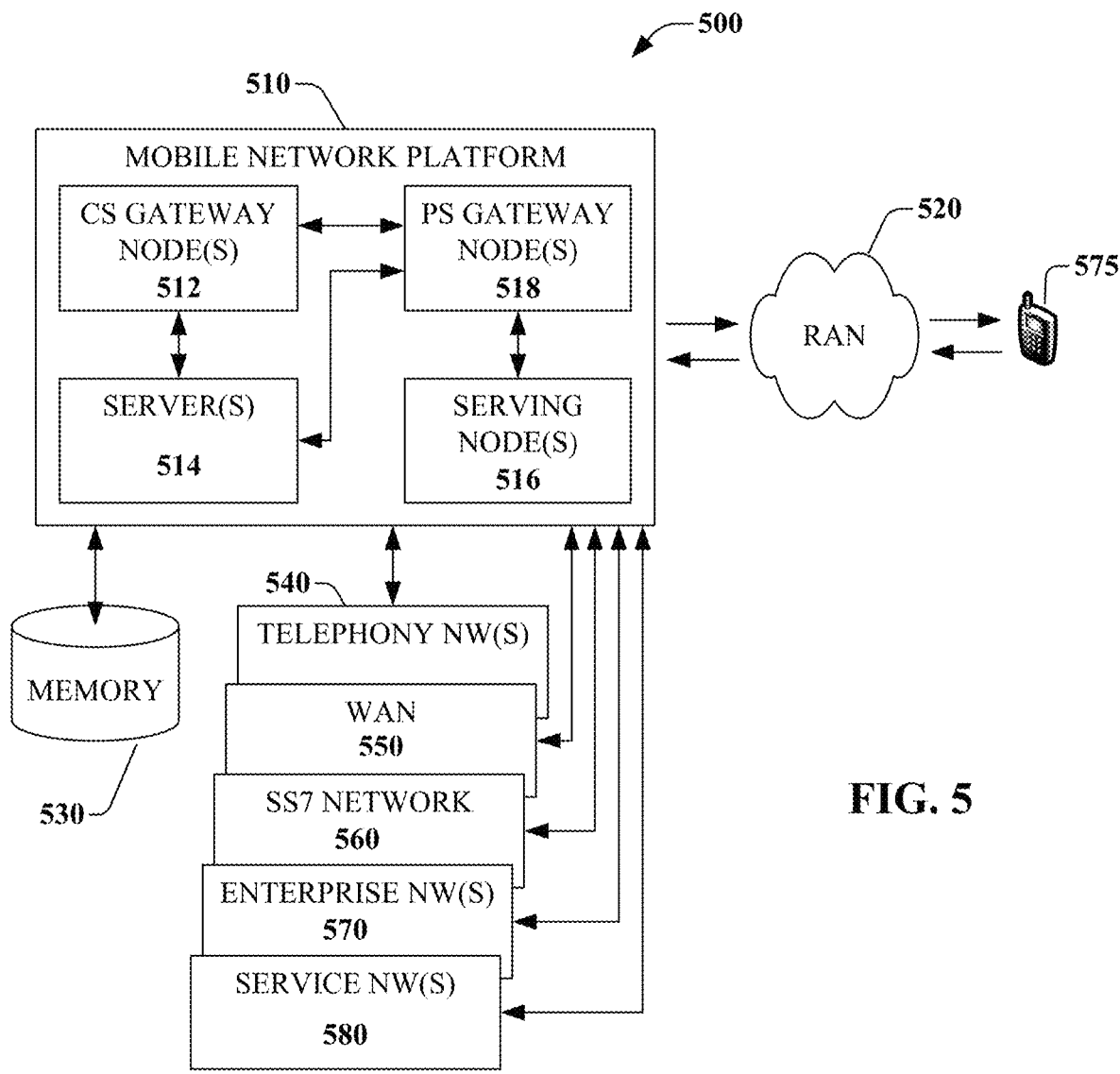
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selection for a particular dual connectivity mobile communication device of a suitable time division multiple access communication configuration (e.g., a time division multiple access communication configuration that minimizes inter-band interference and/or that optimizes use of network resources). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
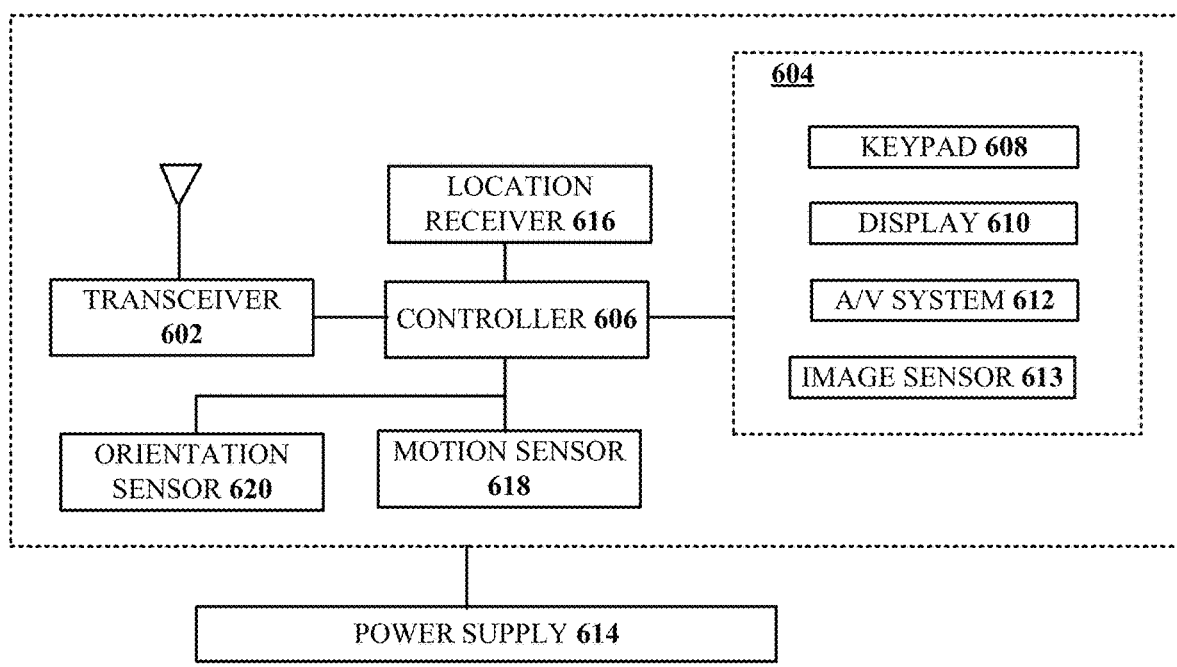
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selection for a particular dual connectivity mobile communication device of a suitable time division multiple access communication configuration (e.g., a time division multiple access communication configuration that minimizes inter-band interference and/or that optimizes use of network resources).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically selecting for a particular dual connectivity mobile communication device a suitable time division multiple access communication configuration (e.g., a time domain division communication configuration that minimizes inter-band interference and/or that optimizes use of network resources)) can employ various AI-based schemes for carrying out various embodiments thereof. Moreover, the classifier can be employed to determine a ranking or priority of each of a plurality of time division multiple access communication configurations and/or a ranking or priority of each of a plurality of dual connectivity mobile communication devices. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of a plurality of time division multiple access communication configurations to select for a particular one of a plurality of dual connectivity mobile communication devices.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
   a processing system including a processor; and
   a memory that stores executable instructions that, when executed by the processing system, facilitate performance of operations, the operations comprising:
      obtaining, for a plurality of dual connectivity mobile communication devices that are in communication range of a first access point that uses a first radio access technology and a second access point that uses a second radio access technology, a plurality of network communication parameters, the first radio access technology being a different radio access technology than the second radio access technology;
      obtaining a list of a plurality of configurations, each configuration of the plurality of configurations identifying one or more time slots in which the first radio access technology is to be used and one or more other time slots in which the second radio access technology is to be used;
      selecting, from the list, a respective configuration to apply to each of the plurality of dual connectivity mobile communication devices, a first configuration that is selected being selected based at least in part upon one or more first network communication parameters of the plurality of network communication parameters, a second configuration that is selected being selected based at least in part upon one or more second network communication parameters of the plurality of network communication parameters; and the first configuration that is selected being different from the second configuration that is selected;

facilitating first communications, via the first access point and the second access point, with a first dual connectivity mobile communication device of the plurality of dual connectivity mobile communication devices according to the first configuration, which is changeable in real-time during the first communications; and facilitating second communications, via the first access point and the second access point, with a second dual connectivity mobile communication device of the plurality of dual connectivity mobile communication devices according to the second configuration, which is changeable in real-time during the second communications.

2. The device of claim 1, wherein:
the first radio access technology is of one generation; and
the second radio access technology is of another generation, the another generation being a subsequent generation relative to the one generation.

3. The device of claim 2, wherein:
the one generation is a 4th generation (4G); and
the another generation being is a 5th generation (5G).

4. The device of claim 1, wherein:
the first access point comprises a first base station radio; and
the second access point comprises a second base station radio.

5. The device of claim 1, wherein:
the first communications with the first dual connectivity mobile communication device comprise first single uplink operation communications; and
the second communications with the second dual connectivity mobile communication device comprise second single uplink operation communications.

6. The device of claim 1, wherein the plurality of network communication parameters are obtained from one or more databases, from the first dual connectivity mobile communication device, from the second dual connectivity mobile communication device, from one or more other mobile communication devices that are within the communication range of the first access point and the second access point, or from any combination thereof.

7. The device of claim 1, wherein the plurality of network communication parameters comprises: one or more first volumes of network traffic carried by the first access point; one or more first transmit power values of the first access point; one or more first receive power values of the first access point; one or more second volumes of network traffic carried by the second access point; one or more second transmit power values of the first access point; one or more second receive power values of the first access point; or any combination thereof.

8. The device of claim 7, wherein:
the one or more first volumes of network traffic carried by the first access point comprise one or more first historic volumes of network traffic, one or more first real-time volumes of network traffic, or any combination thereof;
the one or more first transmit power values of the first access point comprises one or more first historic transmit power values, one or more first real-time transmit power values, or any combination thereof;
the one or more first receive power values of the first access point comprise one or more first historic receive power values, one or more first real-time receive power values, or any combination thereof;
the one or more second volumes of network traffic carried by the second access point comprise one or more second historic volumes of network traffic, one or more second real-time volumes of network traffic, or any combination thereof;
the one or more second transmit power values of the second access point comprise one or more second historic transmit power values, one or more second real-time transmit power values, or any combination thereof; and
the one or more second receive power values of the second access point comprise one or more second historic receive power values, one or more second real-time receive power values, or any combination thereof.

9. The device of claim 1, wherein the plurality of network communication parameters comprises: one or more first volumes of traffic carried by the first dual connectivity mobile communication device; one or more first transmit power values of the first dual connectivity mobile communication device; one or more first receive power values of the first dual connectivity mobile communication device; one or more first locations of the first dual connectivity mobile communication device; one or more second volumes of traffic carried by the second dual connectivity mobile communication device; one or more second transmit power values of the second dual connectivity mobile communication device; one or more second receive power values of the second dual connectivity mobile communication device; one or more second locations of the second dual connectivity mobile communication device or any combination thereof.

10. The device of claim 9, wherein:
the one or more first volumes of traffic carried by the first dual connectivity mobile communication device comprise one or more first historic volumes of traffic, one or more first real-time volumes of traffic, or any combination thereof;
the one or more first transmit power values of the first dual connectivity mobile communication device comprise one or more first historic transmit power values, one or more first real-time transmit power values, or any combination thereof;
the one or more first receive power values of the first dual connectivity mobile communication device comprise one or more first historic receive power values, one or more first real-time receive power values, or any combination thereof;
the one or more first locations of the first dual connectivity mobile communication device comprise one or more first historic locations of the first dual connectivity mobile communication device, one or more first real-time locations of the first dual connectivity mobile communication device, or any combination thereof;
the one or more second volumes of traffic carried by the second dual connectivity mobile communication device comprise a second historic volume of traffic, one or more second real-time volumes of network traffic, or any combination thereof;
the one or more second transmit power values of the second dual connectivity mobile communication device comprise one or more second historic transmit power values, one or more second real-time transmit power values, or any combination thereof;

the one or more second receive power values of the second dual connectivity mobile communication device comprise one or more second historic receive power values, one or more second real-time receive power values, or any combination thereof; and
the one or more second locations of the second dual connectivity mobile communication device comprise one or more second historic locations of the second dual connectivity mobile communication device, one or more second real-time locations of the second dual connectivity mobile communication device, or any combination thereof.

11. The device of claim 1, wherein the selecting each respective configuration is performed in real-time, based at least in part upon the plurality of network communication parameters that have been updated.

12. The device of claim 1, wherein:
the facilitating the first communications, via the first access point and the second access point, with the first dual connectivity mobile communication device comprises engaging in the first communications, by the device, with the first dual connectivity mobile communication device; and
the facilitating the second communications, via the first access point and the second access point, with the second dual connectivity mobile communication device comprises engaging in the second communications, by the device, with the second dual connectivity mobile communication device.

13. The device of claim 1, wherein the operations further comprise:
transmitting, to the first dual connectivity mobile communication device, first data indicative of the first configuration; and
transmitting, to the second dual connectivity mobile communication device, second data indicative of the second configuration.

14. The device of claim 1, wherein:
the first dual connectivity mobile communication device comprises a first smartphone, a first laptop computer, a first tablet computer, or any combination thereof; and
the second dual connectivity mobile communication device comprises a second smartphone, a second laptop computer, a second tablet computer, or any combination thereof.

15. A non-transitory machine-readable medium comprising executable instructions that, when executed by a processing system having a processor, facilitate performance of operations, the operations comprising:
obtaining, for a first dual connectivity mobile communication device that is in communication range of a first access point that uses a first radio access technology and a second access point that uses a second radio access technology, one or more first network communication parameters, the first radio access technology being a different radio access technology than the second radio access technology;
obtaining, for a second dual connectivity mobile communication device that is in communication range of the first access point and the second access point, one or more second network communication parameters;
obtaining configuration data defining a plurality of configurations, each configuration of the plurality of configurations identifying one or more time slots in which the first radio access technology is to be used and one or more other time slots in which the second radio access technology is to be used;
making a first determination, based at least in part upon the one or more first network communication parameters, as to which of the plurality of configurations to assign to the first dual connectivity mobile communication device for first communications with the first access point and the second access point, resulting in a first assigned configuration;
making a second determination, based at least in part upon the one or more second network communication parameters, as to which of the plurality of configurations to assign to the second dual connectivity mobile communication device for second communications with the first access point and the second access point, resulting in a second assigned configuration, the second assigned configuration being a different configuration than the first assigned configuration;
transmitting first communication data identifying the first assigned configuration to the first dual connectivity mobile communication device, the transmitting the first communication data identifying the first assigned configuration to the first dual connectivity mobile communication device facilitating a first real-time adjustment by the first dual connectivity mobile communication device of a first wireless communication session with a network; and
transmitting second communication data identifying the second assigned configuration to the second dual connectivity mobile communication device, the transmitting the second communication data identifying the second assigned configuration to the second dual connectivity mobile communication device facilitating a second real-time adjustment by the second dual connectivity mobile communication device of a second wireless communication session with the network.

16. The non-transitory machine-readable medium of claim 15, wherein the one or more first network communication parameters are a same set of network communication parameters as the one or more second network communication parameters.

17. The non-transitory machine-readable medium of claim 15, wherein:
the first access point comprises a 4th generation (4G) base station radio; and
the second access point comprises a 5th generation (5G) base station radio.

18. A method comprising:
engaging, by a first dual connectivity mobile communication device including a processing system having a processor, in wireless communications with a network, the network comprising a first access point that uses a first radio access technology and a second access point that uses a second radio access technology, the first radio access technology being a different radio access technology than the second radio access technology, and the first dual connectivity mobile communication device being in communication range of the first access point and the second access point;
transmitting first information, by the first dual connectivity mobile communication device, to the network, the first information facilitating a first selection by the network of a first configuration, the first configuration identifying one or more first time slots in which the first radio access technology is to be used by the first dual connectivity mobile communication device for first communications with the first access point and one or more second time slots in which the second radio access technology is to be used by the first dual connectivity mobile communication device for the first communications with the second access point, the first information further facilitating a second selection by the network of a second configuration, the second configuration identifying one or more third time slots in which the first radio access technology is to be used by a second dual connectivity mobile communication device for second communications with the first access point and one or more fourth time slots in which the second radio access technology is to be used by the second dual connectivity mobile communication device for the second communications with the second access point, the second configuration being a different configuration than the first configuration;

receiving second information, by the first dual connectivity mobile communication device, from the network, the second information identifying the first configuration; and adjusting, by the first dual connectivity mobile communication device, the wireless communications with the network in accordance with the second information.

19. The method of claim 18, wherein the first information comprises one or more volumes of traffic carried by the first dual connectivity mobile communication device; one or more transmit power values of the first dual connectivity mobile communication device; one or more receive power values of the first dual connectivity mobile communication device; one or more locations of the first dual connectivity mobile communication device; or any combination thereof.

20. The method of claim 19, wherein the one or more locations of the first dual connectivity mobile communication device are determined based upon a global positioning system (GPS) signal, based upon a wireless triangulation, or any combination thereof.

* * * * *